United States Patent
Soufiani et al.

(10) Patent No.: US 12,391,835 B2
(45) Date of Patent: *Aug. 19, 2025

(54) REFINED SURFACE MODIFIED CARBON BLACK AND METHODS OF MAKING SAME

(71) Applicant: Continental Carbon Co., Houston, TX (US)

(72) Inventors: Raymond Soufiani, Katy, TX (US); Eduardo Vega, Jr., Richmond, TX (US); Lashan M. H. De Silva, Dickinson, TX (US); Frank E. Welsh, Sugar Land, TX (US); Luis P. Chibante, Fredericton (CA)

(73) Assignee: CONTINENTAL CARBON CO., Houston, AS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/939,012

(22) Filed: Nov. 6, 2024

(65) Prior Publication Data

US 2025/0059376 A1   Feb. 20, 2025

Related U.S. Application Data

(60) Continuation-in-part of application No. 18/914,821, filed on Oct. 14, 2024, which is a continuation of application No. 18/589,988, filed on Feb. 28, 2024, now Pat. No. 12,116,485, which is a continuation of application No. 18/197,835, filed on May 16, 2023, now Pat. No. 11,945,956, which is a division of application No. 17/581,544, filed on Jan. 21, 2022, now Pat. No. 11,753,549.

(60) Provisional application No. 63/143,563, filed on Jan. 29, 2021.

(51) Int. Cl.
   *C09C 1/56*     (2006.01)
   *C08L 9/06*     (2006.01)

(52) U.S. Cl.
   CPC ............... *C09C 1/565* (2013.01); *C08L 9/06* (2013.01); *C09C 1/56* (2013.01); *C01P 2002/88* (2013.01); *C01P 2004/02* (2013.01); *C01P 2004/50* (2013.01); *C01P 2004/61* (2013.01); *C01P 2004/62* (2013.01); *C01P 2004/64* (2013.01); *C01P 2006/12* (2013.01); *C01P 2006/42* (2013.01); *C08L 2205/025* (2013.01); *C08L 2312/00* (2013.01)

(58) Field of Classification Search
   None
   See application file for complete search history.

(56) References Cited

U.S. PATENT DOCUMENTS

| | | |
|---|---|---|
| 5,227,425 A | 7/1993 | Rauline |
| 5,708,055 A | 1/1998 | Joyce |
| 2013/0046064 A1 | 2/2013 | Herd et al. |
| 2014/0290532 A1 | 10/2014 | Rodriguez et al. |
| 2020/0189318 A1* | 6/2020 | Calzetta ................. C09C 1/482 |
| 2022/0363864 A1* | 11/2022 | Westenberg ............. C08K 3/22 |

FOREIGN PATENT DOCUMENTS

| WO | 2017074050 A1 | 5/2017 |
|---|---|---|
| WO | 2021001156 A1 | 1/2021 |

OTHER PUBLICATIONS

Westenberg: Surface Modified Carbon Black for Modern low Rolling Resistance Tires—Compounding Strategy and Process Optimization; Orion Engineered Carbons GmbH; Presented at the 196th Technical Meeting of the Rubber Division, ACS; Cleveland, OH, Oct. 8-10, 2019.

Westenberg: Surface Modified Carbon Black for Modern low Rolling Resistance Tires, Compounding Strategy and Process Optimization; Presented at the 196th Technical Meeting of the Rubber Division, ACS; Cleveland, OH, Oct. 8-10, 2019. Summary (ISSN: 1547-1977) and Presentation.

International Elastomer Conference 2019, Featuring the Expo, 196th Technical Meeting & Educational Symposium, Cleveland, Ohio, USA, Oct. 8-10, 2019, vol. 1 of 2, ISBN: 978-1-5108-9803-5, Table of Contents.

Westenberg: Surface-Modified Carbon Black for new opportunities in tread compound design Orion Engineered Carbons GmbH, Presented at the Tire Technology EXPO 2020, Feb. 25, 2020.

* cited by examiner

*Primary Examiner* — Robert T Butcher
(74) *Attorney, Agent, or Firm* — Emerson, Thomson & Bennett, LLC; Daniel A. Thomson

(57) ABSTRACT

A non-ASTM low hysteresis carbon black chemically treated, and surface coated with a compound comprising at least one amine group and at least one thiol group, and/or di- and/or polysulfidic linkage is herein disclosed. The surface modified low hysteresis carbon blacks are post treated to remove excess surface modified compound to form refined surface modified low hysteresis carbon blacks.

15 Claims, 2 Drawing Sheets

REFINED SURFACE MODIFIED CARBON BLACK AND METHODS OF MAKING SAME

CROSS-REFERENCE TO RELATED APPLICATIONS

This application is a continuation-in-part U.S. application Ser. No. 18/914,821, filed Oct. 14, 2024, which is a continuation of U.S. application Ser. No. 18/589,988 filed Feb. 28, 2024, now U.S. Pat. No. 12,116,485, which is a continuation of U.S. application Ser. No. 18/197,835, filed May 16, 2023, now U.S. Pat. No. 11,945,956, which is a divisional of U.S. application Ser. No. 17/581,544 filed Jan. 21, 2022, now U.S. Pat. No. 11,753,549, which claims the benefit of U.S. provisional patent application Ser. No. 63/143,563, filed Jan. 29, 2021, the disclosures of each of which are hereby incorporated herein by reference in its entirety for purposes not contrary to this disclosure.

STATEMENT REGARDING FEDERALLY SPONSORED RESEARCH OR DEVELOPMENT

Not Applicable.

BACKGROUND

This disclosure relates to a surface modified carbon black compound. This disclosure also relates to a refined surface modified carbon black compound.

BACKGROUND OF DISCLOSURE

Rolling resistance, wet traction, and wear resistance are three major properties of importance for tire manufacturers and form the "tire performance triangle" of these properties. With ASTM standard carbon blacks, it has conventionally been impossible to improve all three properties at the same time, and tire manufacturers thus typically utilize silica as a filler in certain types of tread compounds to significantly improve rolling resistance and wet traction with no negative effect on wear resistance. Most recently, surface modified low hysteresis carbon blacks have shown simultaneously improvement of rolling resistance, wet traction, and wear resistance (e.g. U.S. Pat. No. 11,945,956 B2).

Compounding with silica is, however, costly due to the abrasive nature of silica, which results in the need for costly machinery maintenance and the use of expensive coupling agents to act as a bridge between silica and polymer. Compared to carbon black, silica is more difficult to process, has no advantage in dry traction, is nonconductive, and it is thus ultimately necessary to combine silica with carbon black. Additionally, although the use of silica can improve rolling resistance and wet traction in certain rubber compounds, these advantages are not present in all rubber compounds, notably natural rubber used in truck tires.

Previous strategies have been attempted in order to develop new specialty carbon blacks and/or modify ASTM grade carbon blacks in order to produce compounds with similar properties to those provided by silica compounds. These strategies have mainly focused on increasing filler-polymer interactions and minimizing filler-filler interactions by modifying carbon black, polymer and mixing procedures.

For example, low hysteresis carbon black has developed to improve rolling resistance. Compared to corresponding ASTM grade carbon black, low hysteresis carbon black has a wider aggregate size distribution, with a higher percentage of larger aggregates. When the carbon black aggregate size distribution is narrow, it has a greater tendency to form stronger filler-filler networking in the rubber compound. Therefore, using carbon black with widened aggregate size distribution generally decreases the filler-filler networking strength, while maintaining the same average strength of polymer-filler interactions.

Some other previous use has focused on studies on surface treatment of carbon black; most such studies have focused on increasing polymer-filler interactions (e.g., U.S. Pat. No. 5,494,955) Some have shown improvement of rolling resistance, but not with simultaneous improvement in the other properties of the magic triangle (i.e., wet traction and wear resistance). Although improvement in rolling resistance or other properties was achieved, they were not successful in simultaneous improvement of all three properties: rolling resistance, wet traction, and wear resistance. Although filler-polymer interactions were improved, filler-filler networking was still predominant.

Most recently, surface modified low hysteresis carbon blacks have shown simultaneously improvement of rolling resistance, wet traction, and wear resistance (e.g. U.S. Pat. No. 11,945,956 B2). The presence of surface modified compound on carbon blacks in excess may result in adverse effects on final rubber compound properties. Further refining of surface modified carbon blacks may still be required before mixing with polymers to give a final rubber compound.

BRIEF SUMMARY OF DISCLOSURE

Herein disclosed is a refined surface modified low hysteresis carbon black (R-SMLHCB) compound comprising: a low hysteresis carbon black having a surface that has been modified to have a surface modifier attached thereto, wherein the surface modifier comprises at least one amine group and at least one thiol group and/or di- and/or polysulfidic linkage.

Also disclosed herein is a process of refining the surface modified low hysteresis carbon black (SMLHCB) compound to obtain refined surface modified low hysteresis carbon black (R-SMLHCB).

DETAILED DESCRIPTION

Figure 1:
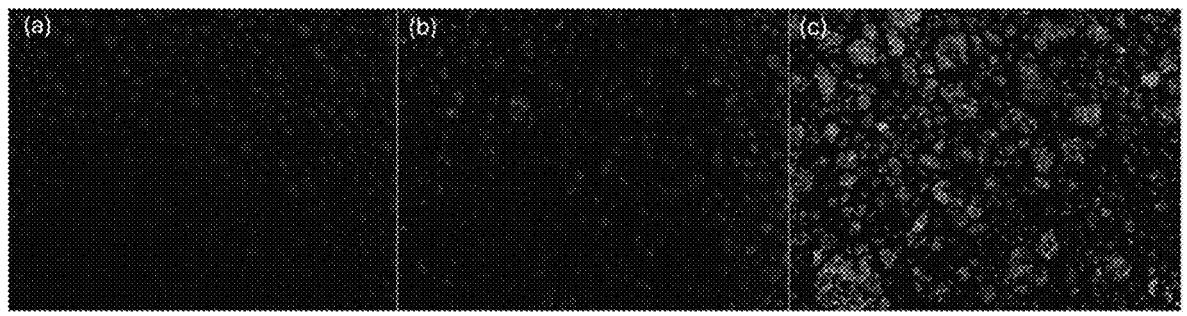
FIG. 1 shows images of (a) Virgin LH11, (b) 4% Cystine coated LH11 and (c) 16% Cystine coated LH11.

The following discussion is directed to various exemplary aspects of this disclosure. However, the aspects disclosed herein should not be interpreted, or otherwise utilized, as limiting the scope of the disclosure, including the claims. In addition, one skilled in the art will understand that the following description has broad application, and the discussion of any aspect is meant only to be exemplary of that aspect, and that the scope of this disclosure, including the claims, is not limited to that aspect.

The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." As used herein, the term "about," when used in conjunction with a percentage or other numerical amount, means plus or minus 10% of that percentage or other numerical amount. For example, the term "about 80%," would encompass 80% plus or minus 8%. References cited herein are incorporated in their entirety by such reference for purposes not contrary to this disclosure. Disclosed herein are aspects of a compound of a surface modifying agent comprises an amino acidic compound or its derivative. Any stereogenic centers present in the compound could be R and/or S configuration. For example, in aspects, the amino acidic compound comprises a naturally occurring amino acid; a modified natural amino acid; a synthetic amino acid; a dimer thereof; a polymer thereof; a salt thereof; a derivative thereof, or a combination thereof. Nonlimiting examples of surface modifying agents suitable for use in the present disclosure include cysteine, cystine, homocysteine, homocystine, methionine, cysteamine, cystamine, cystine dimethyl ester, and a combination thereof.

In the present teaching, the surface modifying agent comprises an amino acidic compound or its derivative having at least one amine group and one thiol group and/or di- and/or polysulfidic linkage, and/or an organic or inorganic compound containing at least one amine group, and at least one thiol group and/or di- or polysulfidic linkage. In the present teaching, the amine group described here is not limited to a primary amine group which may be any type of amine (e.g., secondary amine or tertiary amine with or without presence of a catalyst) suitable for linking to the carbon black surface. The surface modifying agent may comprise more than one amine or other functional groups. The surface modifying agent may be chemically linked to the surface of the carbon black (e.g., the surface of the low hysteresis carbon black) via single or multiple bonds. In the present teaching, the surface modifying agent functions to form at least one bond to the surface of the low hysteresis carbon black (e.g., an amide bond).

In the present teaching, the surface modifier comprises from about 0.1 to about 50 wt %, from about 0.1 to about 30 wt %, from about 1.0 to about 16 wt %, or from about 3 to about 20 wt % of the surface modified carbon black (e.g., of the surface modified low hysteresis carbon black (SMLHCB)).

In one aspect of the present teaching, the low hysteresis carbon black, with or without pretreatment such as oxidation, is treated with the surface modifying agent using any suitable methodology. In one aspect of the present teaching, SMLHCB is prepared by treating the surface of the low hysteresis carbon black with about 0.1% (w/v) to about 50% (w/v), with about 0.1% (w/v) to 30% (w/v), preferably with about 1% (w/v) to about 20% (w/v) of surface modifying agent in a suitable solvent (e. g., water) via acid-base process described in U.S. Pat. No. 11,945,956 B2 or heat treatment process described in U.S. Patent Application No. 2024/0002671 A1. In one aspect of the present teaching, the mixing of carbon black with surface modifying agent containing solution can be carried out by a technique of pouring, spraying, injecting, dispersing, or diffusing. Upon reaction, the resulting material is a SMLHCB.

In the present teaching, generally there are two types of interactions between carbon black and the surface modifying agent occurring upon such a mixing: chemisorption and physisorption. Unfortunately, this interaction has counterproductive effects. Specifically, the presence of loosely bound or physiosorbed surface modifying agent on carbon black results in adverse effects on mechanical properties of the final rubber compound (e.g. poor elongation at break of surface modified carbon black containing rubber compounds in WO Patent Application No. WO 2021/001156 A1). Weak mechanical properties are not desired for some rubber applications. In one aspect of the present teaching, herein discloses a post-purifying or refining procedure for surface modified carbon blacks. Such a refining process removes the loosely bound or physiosorbed surface modified compound.

In one aspect of the present teaching, the SMLHCB is refined using a suitable solvent (e.g., water) to remove weakly bound surface modifying agent. Refining of the SMLHCB as a slurry may be carried out in any suitable vessel without but preferably with agitation. In some aspects, subsequent to refining of the SMLHCB with the solvent, the solid carbon material and fluid may be separated, and the solid carbon material used with or without further refining.

In some aspects, refining of the SMLHCB is carried out a plurality of times in cycles involving contacting of the SMLHCB with a first amount of a solvent, removal of the fluid and refining the SMLHCB with a second amount of solvent. This may be carried out for any number of cycles so as to meet objectives, desired properties, and final product performance. In another aspect of the present teaching, there may be just 1 refining cycle, or alternatively the number of refining cycles may range from about 1 to about 10, alternatively from about 1 to about 6 or alternatively from about 1 to about 4. The resulting material is termed a refined SMLHCB and designated SMLHCB-R. In the present teaching, the resultant SMLHCB or SMLHCB-R comprises functionalities derived from the surface modifying agent bonded to the surface of the low hysteresis carbon black.

In aspects wherein the SMLHCB is unrefined, the material additionally contains advantageous associated surface modifying agents or fragments thereof that are electrostatically (ionically) bonded, covalently bonded, Van der Waals forces bonded, hydrogen bonded, other non-covalently bonded with active surface moieties of the surface or alternatively not bonded to the surface of the low hysteresis carbon black and thus at least a portion of which are readily removable by refining the material. Non-limiting examples of types of bonding that may occur between the functionalities present in the surface modifying agent and the low hysteresis carbon black thus include Van der Waals interactions, covalent (including dative bonds) and/or ionic or other non-covalent interactions with active surface moieties of the surface. In one or more aspect of the present teaching, the active surface moieties of the surface of SMLHCB and/or SMLHCB-R comprise oxygen, nitrogen, and/or sulfur and other elements found in materials used in carbon black manufacturing and rubber compounding.

In one aspect of the present teaching, a low hysteresis carbon black suitable for use in preparation of the SMLHCB can be pretreated by oxidation prior to treatment with a surface modifying agent. Such an oxidative process can be performed to increase the number of acidic groups on the surface of carbon black available to react with, for example, an amine group of the surface modifying agent. In one aspect of the present teaching, the pretreatment by oxidation of the carbon black may be performed by methods such as, but not limited to, ozone treatment, heat treatment, plasma treatment, nitrogen oxides treatment, gaseous or aqueous hydrogen peroxide treatment, liquid nitric acid treatment, or a combination thereof.

Another pretreatment may comprise increasing the number of acidic groups on the surface of the low hysteresis carbon black before or during the treatment with a surface modifying agent. Accordingly, in embodiments, the method can further comprise using the low hysteresis carbon black directly without acid treatment or activating the surface and/or treating the surface with an acid to facilitate the treating of the surface with the surface modifying agent. Further pretreatment may comprise converting the carboxylic acid groups on the low hysteresis carbon black to acyl chloride or acid anhydrides prior to treatment with a surface modifying agent. Compared to carboxylic acid, acyl chloride and acid anhydrides readily react with amines.

In one aspect of the present teaching, a SMLHCB is characterized by a carbon black material having a widened aggregate size distribution with a higher percentage of larger aggregates than a standard ASTM grade carbon black that does not demonstrate low hysteresis when compounded. In one aspect of the present teaching, an aggregate size of the low hysteresis carbon black can be in a range of from about 0.005 to about 1.0 micrometers (μm), from about 0.01 to about 0.8 μm, or from about 0.02 to about 0.6 μm. In one aspect of the present teaching, a SMLHCB can have a surface area (e.g., a BET surface area) ranging from about 10 $m^2/g$ to about 300 $m^2/g$, alternatively from about 20 $m^2/g$ to about 200 $m^2/g$, or alternatively from about 30 to about 150 $m^2/g$.

A SMLHCB or SMLHCB-R, prepared as disclosed herein may be characterized by a surface having an increased number of functionalities present on the surface of the particles when compared to an otherwise similar composition prepared in the absence of acid-base coupling or thermochemical coupling. Compared to coating and acid-base procedures (e.g., see U.S. Pat. No. 11,945,956 B2), the thermochemical coupling procedure (e.g., see U.S. Patent Application No. 2024/0002671 A1) provides several advantages including: an increased reaction rate of coupling at high temperatures, avoided re-formation of insoluble surface modifying compounds, reduced inhomogeneity of the reaction and coated product, direct exposure of carbon black surface groups to surface modifying compound, rapid water loss in the amide bond formation reaction at high temperatures which speeds up the coupling reaction and reduced drying time of surface treated carbon black.

EXAMPLES

The aspects of the present teaching having been generally described, the following examples are given as particular aspects of the present teaching and to demonstrate the practice and advantages thereof. It is understood that the examples are given by way of illustration and are not intended to limit the specification of the claims in any manner.

Example 1

Refined Surface Modified Carbon Black (SMLHCB-R) Preparation I

SMLHCB samples were prepared using the acid-base procedure described in U.S. Pat. No. 11,945,956 B2. Cystine (Formula 1) was used as the chemical modifying agent and LH11 (low hysteresis version of ASTM N234) was used as the carbon black.

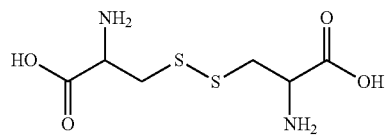

Formula 1

The water solubility of cystine is low at about 0.1 g/L. Conversion of cystine to the anionic form (sodium salt) can be attained by treating with a base (e.g. NaOH). The reaction of cystine with base to create the soluble anionic form is stoichiometric, so a known amount of base can be added. To neutralize the cystine salt on the carbon black surface, the carbon black can first be acidified with the equivalent amount of acid (such as, but not limited to, hydrochloric acid (HCl)) in deionized water. The coating can be preformed by the slow addition of basic cystine solution to acidified carbon black suspension with constant stirring, while monitoring the pH of the batch.

Upon completion of cystine addition, the carbon black (CB) settled in a uniform layer and the NaCL/water supernatant layer was decanted. The CB can then be washed and dried. For example, in this Example 1, the carbon was washed, e.g., 3 to 4 times, with deionized water, to remove traces of NaCl. The wet carbon/cystine slurry was then air dried, followed by oven drying for 2 hours at 140° C. to obtain SMLHCB.

Depending on the initial concentration of cystine solution used, excess cystine is deposited on the carbon black surface (FIG. 1). Compared to 16% cystine coated LH1, 4% cystine coated LH11 appeared to be black color. 16% cystine coated LH11 contained white color deposits on the carbon black. Which indicated the presence of excess cystine.

Figure 2:
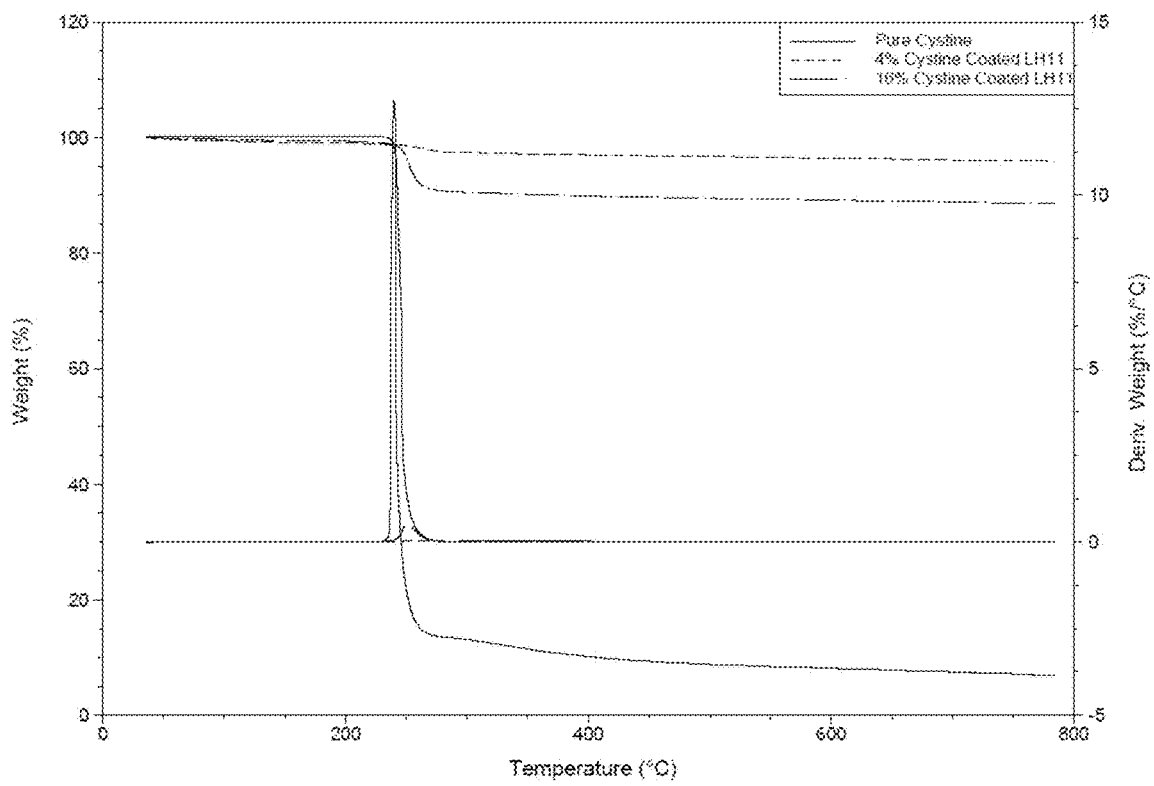
FIG. 2 shows thermogravimetric (TGA) plots of pure cystine, 4% Cystine coated LH11, and 16% cystine coated LH11.

The excess cystine can be characterized by thermogravimetric method as shown in FIG. 2. Pure cystine has a thermal degradation peak around 250° C. 16% cystine coated LH11 showed a similar degradation peak at the same temperature in high extent compared to the 4% cystine coated LH11. This indicated that 16% cystine coated LH11 contained more loosely bound cystine.

Refining of Cystine Coated LH11

Figure 3:
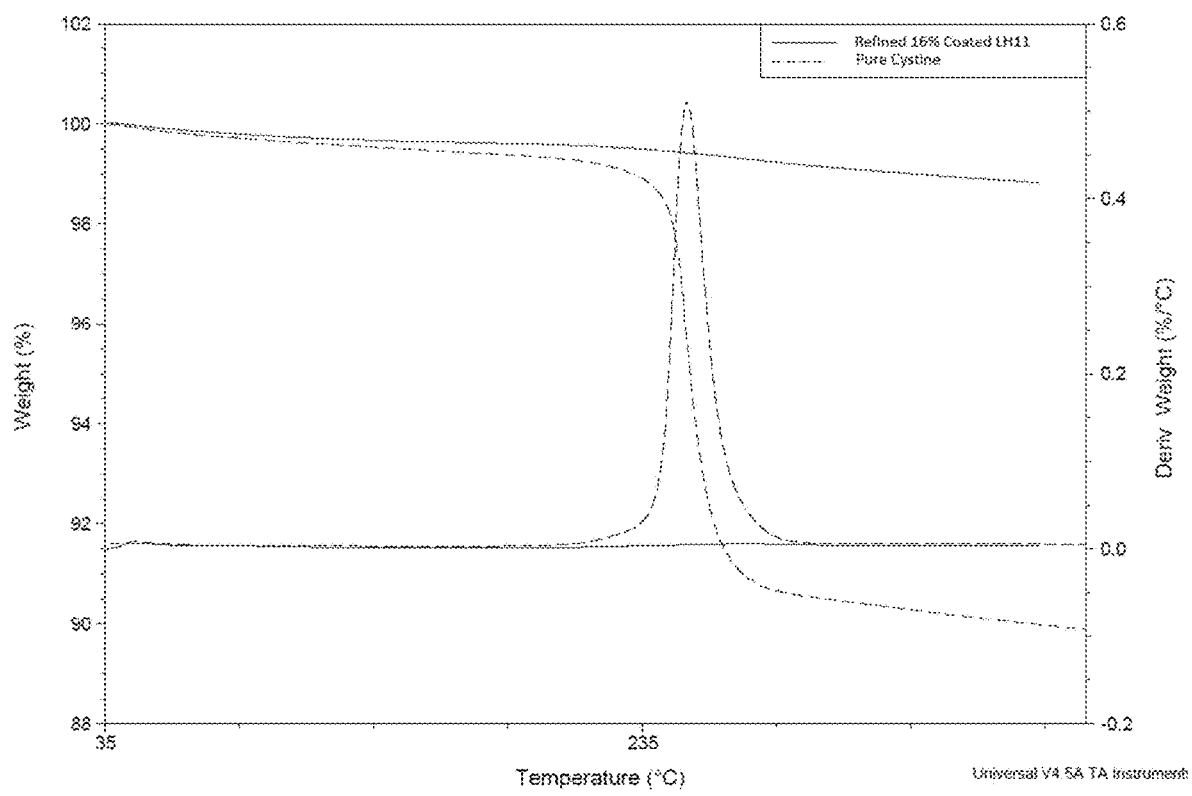
FIG. 3 shows thermogravimetric (TGA) plots of pure cystine and refined 16% cystine coated LH11.

Both 4% and 16% coated LH11 carbon blacks were treated with excess amount of 2% (w/v) sodium carbonate solution. The treated solutions were vacuum filtered using Buchner funnel and carbon blacks on the funnel were washed with deionized water until pH value of the filtrate did not change. The wet carbon black slurry was then air dried, followed by oven drying for 2 hours at 140° C. The dried carbon black samples were analyzed by TGA. TGA plots of pure cystine and refined 16% cystine coated LH11 indicated the removal of loosely bound cystine (FIG. 3).

Example 2

Refined Surface Modified Carbon Black (SMLHCB-R) Preparation II

SMLHCB samples were prepared using the thermochemical coupling procedure described in U.S. Patent Application No. 2024/0002671 A1. Cystine disodium salt was used as a non-limiting example. Cystine disodium salt (2%, 5% and 8% (w/v)) were dissolved in water or cystine (2%, 5% and 8% (w/v)) were dissolved in a caustic solution, (e.g., sodium hydroxide) with or without heat aiding, and the solution was added to the pre-weighed LH11 carbon black, and the mixture was kept in an oven at 140° C. for 8 hours. In addition, some surface modified carbon blacks were further refined with water 1-4 times to remove the weakly bound cystine disodium salt. The wet carbon/cystine salt slurry was air dried, followed by oven drying at 140° C. overnight to form SMLHCB-R.

Surface modified carbon blacks were characterized using X-ray florescence (XRF) per ASTM D1619-16, Method B. The coating percentage resulting by reacting with the cystine disodium salt was calculated by difference of sulfur content before and after the surface modification of the carbon black. Results are presented in Table I. STC # in Table I, are SMLHCB of the present teaching having been treated with differing amounts of surface modifying agents. Specifically, the term, #, being either 2 or 5 or 8 which designates the concentration of coupling agent in weight to volume percent (% w/v) in the treated solution. A sample with the designation W in STC #W indicates the sample was refined subsequent to treatment with the surface modifying agent to form a SMLHCB-R.

TABLE I

Sulfur analysis results and calculated coating levels for LH11 treated with 2%, 5% and 8% of cystine disodium salt solutions

| Property | | LH11 | STC2 | STC2W | STC5 | STC5W | STC8 | STC8W |
|---|---|---|---|---|---|---|---|---|
| | | Surface Modified LH11 Carbon Black | | | | | | |
| Sulfur Content | % | 0.82 | 1.80 | 1.25 | 2.94 | 1.70 | 3.20 | 1.79 |
| Coating Level | % | N/A | 4.33 | 1.90 | 9.36 | 3.89 | 10.51 | 4.28 |

Additional Disclosure

The following are non-limiting, specific aspects of the present teaching:

A first aspect of the present teaching comprises: A refined surface modified low hysteresis carbon black (SMLHCB-R) product, comprising: a low hysteresis carbon black having a surface that has been modified to have a surface modifier attached thereto, wherein the surface modifier comprises at least one amine group and at least one thiol group and/or di- and/or polysulfidic linkage.

A second aspect of the present teaching can include SMLHCB-R product of the first aspect, wherein the surface modifier comprises an amino acidic compound or its derivative.

A third aspect of the present teaching can include SMLHCB-R product of the second aspect, wherein the amino acidic compound comprises a naturally occurring amino acid, a modified natural amino acid, a synthetic amino acid, a dimer thereof, a polymer thereof, a salt thereof, a derivative thereof, or a combination thereof.

A fourth aspect of the present teaching can include SMLHCB-R product of the second and third aspects, wherein the amino acidic compound or its derivative comprises cysteine, cystine, homocysteine, homocystine, methionine, cysteamine, cystamine, cystine dimethyl ester, and a combination thereof.

A fifth aspect of the present teaching can include SMLHCB-R product of any one of the prior aspects, wherein the surface modifier comprises an amino acidic compound or its derivative having at least one amine group and at least one thiol group and/or di- and/or polysulfidic linkage, and/or an organic or inorganic compound containing at least one amine group, and at least one thiol group and/or di- and/or polysulfidic linkage.

A sixth aspect of the present teaching can include SMLHCB-R product of any one of the prior aspects, wherein the amine group contained in the surface modifier is any type of amine suitable for linking to the carbon black surface.

A seventh aspect of the present teaching can include SMLHCB-R product of the sixth aspect, wherein the amine group contained in the surface modifier is a primary amine, a secondary amine, or a tertiary amine with or without a catalyst for linking to the carbon black surface.

An eighth aspect of the present teaching can include SMLHCB-R product of any one of the prior aspects, wherein surface modifier is linked to the surface via single or multiple bonds.

A ninth aspect of the present teaching can include SMLHCB-R product of any one of the prior aspects, wherein the surface modifier is linked to the carbon black surface by an amide or other bond formation, chemisorption, and/or physisorption.

A tenth aspect of the present teaching can include SMLHCB-R product of any one of the prior aspects, wherein the surface modifier is linked to the carbon black surface by at least one of, van der Waals interactions, ionic and/or covalent or other non-covalent interactions with active surface moieties of the surface.

An eleventh aspect of the present teaching of the present teaching can include SMLHCB-R product of the tenth aspect, wherein said active surface moieties comprise oxygen, nitrogen, and/or sulfur on the surface.

A twelfth aspect of the present teaching can include SMLHCB-R product of any one of the prior aspects, wherein the surface modifier comprises from about 0.1 wt. % to about 50 wt. % of the surface modified carbon black (e.g., of the SMLHCB-R).

A thirteenth aspect of the present teaching can include SMLHCB-R product of any one of the prior aspects, wherein said SMLHCB-R product has a widened aggregate size distribution with a higher percentage of larger aggregates than a standard ASTM grade carbon black that does not demonstrate low hysteresis when compounded.

A fourteenth aspect of the present teaching can include SMLHCB-R product of any one of the prior aspects, wherein an aggregate size of the low hysteresis carbon black can be in a range of from about 0.005 to about 1.0 micrometers ($\mu$m).

A fifteenth aspect of the present teaching can include SMLHCB-R product of any one of the prior aspects, wherein SMLHCB-R has a surface area ranging from about 10 $m^2/g$ to about 300 $m^2/g$.

A sixteenth aspect of the present teaching can include SMLHCB-R product of any one of the prior aspects, wherein the said surface was oxidized prior to the surface modification of the low hysteresis carbon black filler to produce the SMLHCB-R.

A seventeenth aspect of the present teaching can include SMLHCB-R product of the sixteenth aspect, wherein the surface was oxidized by ozone treatment, heat treatment, plasma treatment, nitrogen oxides treatment, gaseous or aqueous hydrogen peroxide treatment, liquid nitric acid treatment, or a combination thereof.

While aspects of the present teaching have been shown and described, modifications thereof can be made by one skilled in the art without departing from the spirit and teachings of this disclosure. The aspects of the present teaching described herein are exemplary only and are not intended to be limiting. Many variations and modifications of the aspects disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k*(Ru-R1), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present teaching. Thus, the claims are a further description and are an addition to the aspects of the present teaching. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A refined surface modified low hysteresis carbon black (SMLHCB-R) product, comprising:
   a low hysteresis carbon black having a surface that has been modified to have a surface modifier attached thereto, wherein the surface modifier comprises at least one amine group and at least one thiol group and/or di- and/or polysulfidic linkage, wherein the carbon black has an aggregate size greater than 0.1 micrometers and less than 1.0 micrometers, wherein the surface modifier comprises an amino acidic compound or its derivative.

2. The SMLHCB-R product of claim 1, wherein the amino acidic compound is chosen from the group consisting of a naturally occurring amino acid, a modified natural amino acid, a synthetic amino acid, a dimer thereof, a polymer thereof, a salt thereof, a derivative thereof, and combinations thereof.

3. The SMLHCB-R product of claim 1, wherein the amino acidic compound or its derivative is chosen from the group consisting of cysteine, cystine, homocysteine, homocysteine, methionine, cysteamine, cystamine, cystine dimethyl ester, and combinations thereof.

4. The SMLHCB-R product of claim 1, wherein the surface modifier comprises an amino acidic compound or its derivative having at least one amine group and at least one thiol group and/or di- and/or polysulfidic linkage.

5. The SMLHCB-R product of claim 1, wherein the at least one amine group is suitable for linking to the carbon black surface.

6. The SMLHCB or SMLHCB-R product of claim 5, wherein the at least one amine group is attached with or without a catalyst for linking to the carbon black surface.

7. The SMLHCB-R product of claim 1, wherein surface modifier is linked to the surface via single or multiple bonds.

8. The SMLHCB-R product of claim 7, wherein the surface modifier is linked to the carbon black surface by one or more of the group consisting of an amide, a bond formation, chemisorption, and physisorption.

9. The SMLHCB-R product of claim 7, wherein the surface modifier is linked to the carbon black surface by at least one of the group consisting of van der Waals interactions, ionic interaction, covalent interaction, and non-covalent interactions with active surface moieties of the surface.

10. The SMLHCB-R product of claim 9, wherein the active surface moieties are chosen from the group consisting of oxygen, nitrogen, sulfur, and combinations thereof on the surface.

11. The SMLHCB-R product of claim 1, wherein the surface modifier comprises from about 0.1 wt. % to about 50 wt. % of the surface modified carbon black.

12. The SMLHCB-R product of claim 1, wherein an aggregate size of the low hysteresis carbon black particles have aggregate size greater than 0.1 micrometers and less than 0.8 micrometers.

13. The SMLHCB-R product of claim 1, wherein the SMLHCB-R has a surface area ranging from about 10 $m^2/g$ to about 300 $m^2/g$, wherein the carbon black particles have an aggregate size greater than 0.1 micrometers and less than 0.8 micrometers.

14. The SMLHCB-R product of claim 1, wherein the surface was oxidized prior to the surface modification of the low hysteresis carbon black to produce the SMLHCB-R.

15. The SMLHCB-R product of claim 14, wherein the surface was oxidized by at least one of the group consisting of ozone treatment, heat treatment, plasma treatment, nitrogen oxides treatment, gaseous or aqueous hydrogen peroxide treatment, liquid nitric acid treatment, or combinations thereof.

\* \* \* \* \*